United States Patent
Cadieux

(10) Patent No.: US 8,160,097 B2
(45) Date of Patent: Apr. 17, 2012

(54) SYSTEM AND METHOD FOR OPTIMIZING COMMUNICATION BETWEEN A MOBILE COMMUNICATIONS DEVICE AND A SECOND COMMUNICATIONS DEVICE

(75) Inventor: Kevin Cadieux, Solana Beach, CA (US)

(73) Assignee: Broadcom Corporation, Irvine, CA (US)

( * ) Notice: Subject to any disclaimer, the term of this patent is extended or adjusted under 35 U.S.C. 154(b) by 1075 days.

(21) Appl. No.: 12/024,100

(22) Filed: Jan. 31, 2008

(65) Prior Publication Data

US 2009/0116431 A1 May 7, 2009

Related U.S. Application Data

(60) Provisional application No. 60/985,998, filed on Nov. 7, 2007.

(51) Int. Cl.
*H04J 3/16* (2006.01)
(52) U.S. Cl. ...................................... 370/468
(58) Field of Classification Search ........................ None
See application file for complete search history.

(56) References Cited

U.S. PATENT DOCUMENTS

| | | | | |
|---|---|---|---|---|
| 6,101,545 | A * | 8/2000 | Balcerowski et al. | 370/464 |
| 7,525,970 | B2 * | 4/2009 | Mangin et al. | 370/395.21 |
| 2005/0078672 | A1 * | 4/2005 | Caliskan et al. | 370/389 |
| 2007/0147242 | A1 * | 6/2007 | Marilly et al. | 370/230 |
| 2008/0008116 | A1 * | 1/2008 | Buga et al. | 370/328 |
| 2008/0043648 | A1 * | 2/2008 | Buga et al. | 370/310 |
| 2008/0057912 | A1 * | 3/2008 | Deprun | 455/413 |
| 2009/0028082 | A1 * | 1/2009 | Wynn et al. | 370/310 |
| 2009/0190533 | A1 * | 7/2009 | Zhu et al. | 370/328 |
| 2009/0219946 | A1 * | 9/2009 | Liu et al. | 370/437 |

* cited by examiner

*Primary Examiner* — Anh-Vu Ly
(74) *Attorney, Agent, or Firm* — Brake Hughes Bellermann LLP

(57) ABSTRACT

A mobile communications device includes one or more antennas and a plurality of wireless transceivers that are each configured to transmit and receive transmissions via the one or more antennas according to at least one of several associated communications protocols. The device includes a control processor operatively coupled to the transceivers and antenna(s), which is configured to select and utilize one or more of the wireless transceivers and associated communications protocols in order to transact particular transmissions, where the selection is based on characteristics of the particular transmissions, and to allocate bandwidth to multiple transmissions within a single communications protocol, where the allocation is based on characteristics of the transmissions. The device also includes a power source coupled to the transceivers and adapted to supply power to the transceivers.

17 Claims, 5 Drawing Sheets

SYSTEM AND METHOD FOR OPTIMIZING COMMUNICATION BETWEEN A MOBILE COMMUNICATIONS DEVICE AND A SECOND COMMUNICATIONS DEVICE

CROSS-REFERENCE TO RELATED APPLICATIONS

The application claims priority under 35 U.S.C. §119(e) to a U.S. Provisional Patent Application Ser. No. 60/985,998, filed Nov. 7, 2007, entitled, "SYSTEM AND METHOD FOR OPTIMIZING COMMUNICATION BETWEEN A MOBILE COMMUNICATIONS DEVICE AND A SECOND COMMUNICATIONS DEVICE," which is incorporated by reference for all purposes.

TECHNICAL FIELD

This description relates to mobile device communication, and, in particular, to a system and method for dynamically allocating transmissions across available communications protocols to maximize quality of service for the user.

BACKGROUND

When communicating using a mobile device, users often wish to transmit and receive many types of messages. As mobile communications devices have become more advanced, they have steadily incorporated not only increased functionality at the software and hardware level but also additional means of communication. For example, a mobile communications device may offer an e-mail client through which a user can send and receive e-mail; an expandable memory for storage of e-mail attachments, documents, multimedia files and other information; a viewer or editor application for several types of documents; a calendar application capable of handling appointments and reminders; an address book managing contact records; a Web browser capable of displaying Web pages; and other applications, including those for specialized Internet access. Multimedia applications and hardware support have also increased. For instance, a typical mobile communications device may have a camera capable of generating still images and capturing video files; a microphone to record audio files; an audio player capable of playing music and sound files of various formats; a video player capable of playing several formats of video files; a photo viewer application, and similar features. The mobile communications device may also include several distinct communications protocols, such as Bluetooth, WiFi, ultra wide band (UWB), infrared (IR), cellular GSM or other protocols.

This increasing complexity in mobile communications devices often results in a number of ways that can be used to complete a given transmission with a mobile communications device. For instance, if a user of the mobile communications device wishes to transmit a file to a wireless-enabled printer, the transmission might be handled via Bluetooth, WiFi, IR or another wireless protocol that depends upon how the mobile communications device is configured to interoperate with the printer. The configuration of the mobile communications device generally is predetermined based on the capabilities of the mobile device and of the printer and the range between them.

Currently mobile communications devices generally employ their various communications protocols in a manner both limited and limiting: typically a given application running on the device will default to a certain protocol (e.g., file transfer between mobile devices may default to Bluetooth) while in some cases the user is asked to select a protocol. This approach fails to exploit the full capabilities presented by a variety of communications protocols, and tasks the user with making a selection he or she may be unsure how best to make. The quality of service for the user suffers because decisions affecting communications resource allocation are either preset or given to the user, who may not know the best protocol to use, their relative benefits and drawbacks, or the other transmissions currently being handled by the mobile device.

SUMMARY

The details of one or more implementations are set forth in the accompanying drawings and the description below. Other features will be apparent from the description and drawings, and from the claims.

DETAILED DESCRIPTION

Various different communications protocols have inherent characteristics that may prove relatively advantageous or disadvantageous for a particular transmission depending on the circumstances. For instance, Bluetooth tends to have low power consumption per bit transferred, but at the expense of a lower data rate and shorter range than WiFi. UltraWideBand (UWB) for example has a shorter range still, but allows a relatively high rate of data transfer. Such characteristics can be quantified: each communications protocol inherently has a particular maximum data rate, energy consumed per bit transmitted, overall energy cost, operative range, and latency/quality of service. Future communications protocols can also be evaluated in these terms or in other quantifiable terms.

Many types of messages can be sent or received by a mobile communications device, and the various messages can have very different characteristics. For example, a streaming video file being actively recorded by the user with the camera on the mobile device would require a high data rate transfer and high quality of service to ensure the transmission is not dropped or interrupted, since live video may be impossible to reproduce. In contrast, a stored document file could be transferred via a protocol with a lower quality of service, because if the connection were to drop packets the transfer could simply be delayed or begun anew. Consequently, different communications protocols are better suited to handling particular types of messages, or more broadly, messages with a certain set of characteristics. Additionally, in some circumstances the user may wish to prioritize a certain characteristic over another, for instance pushing a small file through very quickly or allowing a large file to stream in the background overnight.

The features used to characterize messages can include reproducibility (i.e., whether data can be re-sent if errors or interruptions are encountered—e.g., voice or live video streams for instance cannot be re-sent, whereas stored files generally can be resent), which strongly influences the quality of service the user will tolerate for a given message; priority; optimal data rate; size in memory; transfer availability (e.g., if the file is waiting to be sent in a burst, or if it will be read and streamed slowly—the protocol selected ideally should have a data rate at least as high as the rate at which the file becomes available for sending); and other similar characteristics.

As described herein a mobile communications device can be configured to deduce the optimal assignment of communications protocols and allocation of bandwidth for each message it transmits, based upon the circumstances at hand.

Figure 1:
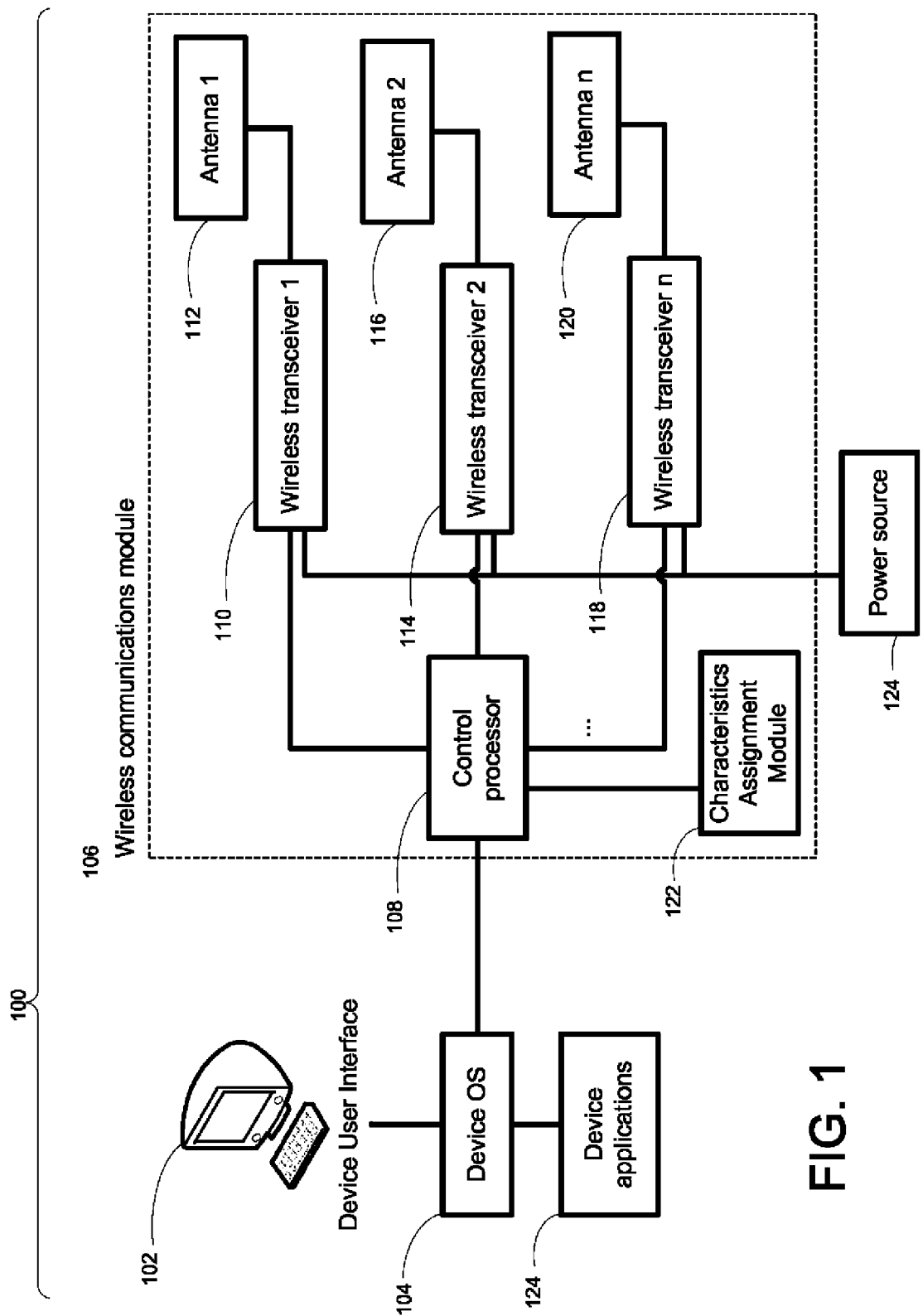
FIG. 1 is a schematic diagram of a system capable of optimizing communication between a mobile communications device and other communications devices.

FIG. 1 is a schematic diagram of a system 100 capable of optimizing communication between a mobile communications device and other communications devices. Many wireless communications devices comprise multiple channels for sending and receiving messages via various protocols. The system 100 shown in FIG. 1 is capable of governing the allocation of communications resources to optimize the transmission of multiple messages across several communications protocols, and doing so automatically without specific user control of communications resource allocation. The components of this system 100 are detailed below.

The system 100 includes a device user interface 102 that functions as a gateway for the user to input commands, access information and provide instructions to the device. For example, the device user interface 102 could be a touch-screen interface, a keyboard, stylus, or other input system paired with a display. The device user interface 102 is operatively connected to the device operating system (OS) 104. The device OS 104 is the basic operating system of the mobile device. For example, the device OS 104 may be responsible for maintaining the computing environment, allocating memory, power and storage resources and transferring information between applications, and may be an established operating system such as Microsoft® Windows™, Apple® OSX™, a mobile implementation of such an operating system, or another operating system. Device applications 124 run in the computing environment maintained by the OS 104. Device applications 124 can include user-specified programs or other software running on the device. For example, a user of the mobile device could run an e-mail client, a word processor client, a Web browser, or any combination of these and other programs. These applications 124 and the OS itself 104 may need to exchange information with a multitude of remote services and devices. In addition, the user may wish to transmit other messages from or receive other messages to the mobile device. This multitude of messages can be allocated among available communications resources in such a way as to optimize transmission behavior to match the characteristics of each message, in light of available communications protocols on the remote device, power availability, network congestion and user demands, or other considerations.

Central to the system 100 is a wireless communications module 106. The wireless communications module 106 allocates bandwidth among communications channels in such a way as to optimize the transmission and receipt of messages according to their characteristics, the characteristics of the mobile device and those of the remote device. For example, the wireless communications module 106 may facilitate the simultaneous transmission of several messages with various characteristics alongside the receipt of other messages, each in turn with various characteristics, by allocating bandwidth among several available communications channels. The ability of the wireless communications module 106 to mediate this allocation effectively is reliant upon a control processor 108. The control processor 108 examines all messages to send and receive and the associated characteristics of each message, and allocates communications resources to transmit all messages in the most effective manner so as to optimize the user's experience. For example, the control processor may consider message priority, reproducibility, size in memory, availability for burst transfer, preferred data rate, or user overrides to priority or other characteristics, and use these characteristics for each message to optimize the allocation of messages among available communications channels. Message characteristics are assigned by a characteristics assignment module 122 that is operatively connected to the control processor 108. The characteristics assignment module 122 is responsible for assigning a suite of characteristics to all messages being considered by the control processor 108. For example, the characteristics assignment module 122 may assign characteristics using a matrix of predetermined message types and associated characteristics, or via input from the device OS 104, or based on direct input from the user via the device user interface 102.

The control processor 108 is operatively coupled to a plurality of communications channels, each comprising a wireless transceiver 110 and an antenna 112. The control processor sends messages and receives messages via these communications channels. In the example shown, the control processor 108 can be coupled to wireless transceivers 110, 114, and 118, which are in turn coupled to three antennae 112, 116, and 120. The control processor 108 can be coupled to a plurality of communications channels, indicated in FIG. 1 by wireless transceiver n 118 and antenna n 120. The communications channels may be optimized for different communications protocols. For example, one transceiver and antenna may be configured to transmit data via the Bluetooth protocol, while another transceiver and antenna may be configured to transmit data via wireless Ethernet (WiFi), another transceiver and antenna may be configured to transmit data via ultra-wideband (UWB) radio, and so on. Each communications channel in the wireless communications module 106 is operatively coupled to a power source 124. The power source 124 provides power to the communications equipment, enabling the transmission and receipt of data via these protocols. For example, the power source 124 may be a battery in the mobile device and therefore operatively connected to all communications hardware contained therein.

Figure 2:
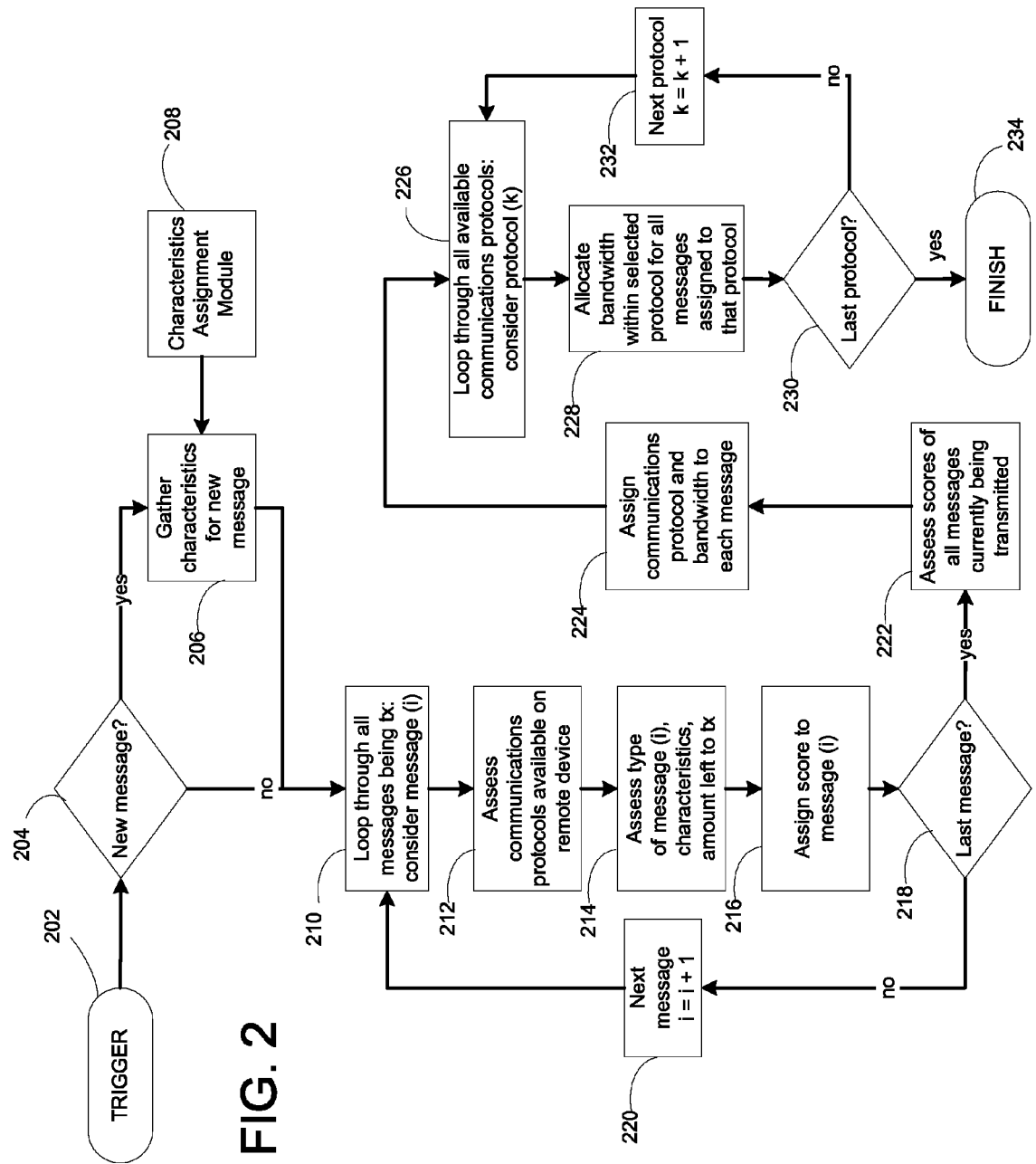
FIG. 2 is a schematic flowchart outlining a method for transmitting or receiving one or more messages using one or more communications protocols, and selecting and allocating bandwidth among protocols based upon characteristics of the message(s) and the receiving device.

FIG. 2 is a schematic flowchart outlining a method for transmitting or receiving one or more messages using one or more communications protocols, and selecting and allocating bandwidth among protocols based upon characteristics of the message(s) and the receiving device. In the example of FIG. 2, a plurality of messages are assigned to available communications channels in such a way as to optimize in aggregate their transmission and receipt, except where one or more particular messages have been flagged by the user as having special priority, in which case these are prioritized or de-prioritized accordingly. For example, the process shown in FIG. 2 may take place in the control processor 108 of a mobile communications device, and serve to allocate available communications resources to transmit and receive messages.

The process begins with a trigger (step 202). This trigger (step 202) invokes the routine and precipitates a reconsideration of currently active messages and their characteristics, followed by an allocation of communications resources to transmit or receive the messages under consideration. Examples of the trigger (step 202) may include the introduction of a new message (for instance, when the user issues a command to transmit a new e-mail message), the completion of an existing transmission (for instance, when a message that had been transferring is completed), a change to the power status of the device (for instance, when the battery reaches a level at which certain communications protocols become less favored or more favored, thereby altering the optimal allocation of communications resources), a change to the available protocols on the remote device (for instance, when the device receiving a particular message via one communications protocol (e.g., WiFi) comes into range of a hardware that enables reception of the message using a new communications protocol, (e.g., Bluetooth)), a user change to the priority of one or more messages (for instance, when the user assigns maximum priority to a print job), or any other condition that necessitates a re-evaluation of the allocation of transmission resources to maintain optimum performance and user experience.

Once the trigger (step 202) invokes the process, the existence of a new message is ascertained (step 204). If no new message exists, the process can reassign communications resources based on the completion of an existing transfer or other triggers as explained above, and the process can continue to loop through all active messages (step 210). If a new message exists, the characteristics of this new message can be gathered (step 206) from a characteristics assignment module (step 208), as explained in more detail with reference to FIG. 3, after which the process proceeds to loop through all active messages, including the newly added message (step 210). For example, if the process shown in FIG. 2 is triggered by a user instruction to transmit a new e-mail message, the characteristics of this message can be gathered (step 206) from the characteristics assignment module (208). If, on the other hand, the process is triggered (step 202) by a low-power warning from the device battery such that certain high-energy-cost communications protocols are now no longer favored, the process would proceed directly to loop through active messages (step 210).

Central to the process shown in FIG. 2 are two loops. The first loops through all active messages to assign scores to the messages, and the second loops through all available communications protocols to match scored messages to protocols according to a bandwidth allocate scheme. The first loop considers all active messages (step 210), including any new message just characterized (step 206). The messages can be considered stepwise, with the message currently under consideration indicated in FIG. 2 as message (i) (step 210). For example, if a total of three messages are in the process of being sent and two additional messages are simultaneously being received when the process is triggered by notification that a new message is to be sent, the total number of active messages increases from five to six; and the loop (step 210) would therefore consider messages 1 through 6, with the currently considered message (i) incremented with each iteration of the loop. Within the loop, the communications protocols on the remote device (the device to which the current message is being, or will be, sent, or the device from which this message is being, or will be, received) are assessed (step 212). Assessing the available communications protocols on the remote device (step 212) enables the score assigned to the message to reflect the realities of the communications pairing. For example, if a message was previously being sent from the mobile communications device using the Bluetooth protocol, but the remote (receiving) device falls out of range for Bluetooth communication, then the available choices of communications protocol for continuing the transmission are reduced and the score assigned to the message should not specify Bluetooth as a transmission option.

Next, the message type and characteristics are assessed, along with the amount of the message remaining to transmit or to be received (step 214). These factors are weighed and combined to assign a score to message (i) (step 216). The score assigned to message (i) (step 216) can serve to identify a priority level for the message and to recommend a transfer method, and can be used in later steps to assign message (i) to a communications protocol in such a way as to maximize the overall performance of transmission of all messages via the mobile device. For example, a wireless print job might be assigned to be transmitted via a Bluetooth communications protocol to conserve energy and because the receiving printer is within range of the mobile communications device. In another example, the same print job might be assigned to WiFi if the receiving printer has the capability to receive WiFi messages and the user has flagged the print job as a high priority job. The characteristics of each message, combined with user input regarding message priority, available protocols on the remote device, and factors governing the availability of local communications protocols thus can be synthesized to produce a score (step 216) with which messages will be optimally assigned to available communications resources.

The loop terminates (step 218) after all the messages have been considered, i.e., if message (i) is the last message. If message (i) is not the last message, the next message is considered (step 220), shown in FIG. 2 as incrementing the variable (i) and returning to the beginning of the loop (step 210). If message (i) is the last message and all messages have been assigned scores during this invocation of the process 200, then the loop terminates and exits.

The scores of all active messages are then assessed (step 222). This assessment of scores (step 222) may include weighing the assigned scores against one another, against a metric, or by some other technique to determine the optimal allocation of communication resources (step 224). A communications protocol can be assigned to each message and bandwidth allocation calculations can be performed (step 224), such that each message now has associated characteristics, an assigned score, and an assigned communications protocol and allocated bandwidth. For example, a message may be assigned to be transmitted on a single available protocol, or multiple messages may be assigned to a single protocol, or to multiple protocols.

Following the assignment of scores, another loop occurs (step 226). This loop considers all available communications protocols available on the device, with the protocol currently under consideration shown in FIG. 2 as protocol (k) (step 226). For example, if three distinct communications protocols are available on the device, the loop can consider each of the three in turn, with the currently considered protocol labeled protocol (k) in FIG. 2. Within the loop, bandwidth can be allocated within the selected protocol for all messages assigned to that protocol (step 228). All messages that have been assigned to protocol (k) can be considered to determine the optimal bandwidth allocation within protocol (k) to each message (step 228). For example, an e-mail message, a print job and a Web browser request may be sent via TCP/IP on WiFi, along with another message simultaneously received via WiFi. In the case where the maximum bandwidth of a given transceiver and communication protocol are not required to transmit active messages, then a fractional amount of bandwidth from a given transceiver can be allocated.

The loop repeats until the last protocol is considered (step 230). If the last protocol has not yet been considered, the protocol is incremented (step 232) and the loop begins anew (226). Once all protocols have been considered, and bandwidth has been allocated in each protocol, the process 200 terminates (step 234). The net effect of this process is to consider the characteristics of all active messages, including any new messages, and to allocate resources effectively to achieve optimal transmission of these messages between the client device and one or more remote devices, using in the process any available communications protocol on the client device.

Figure 3:
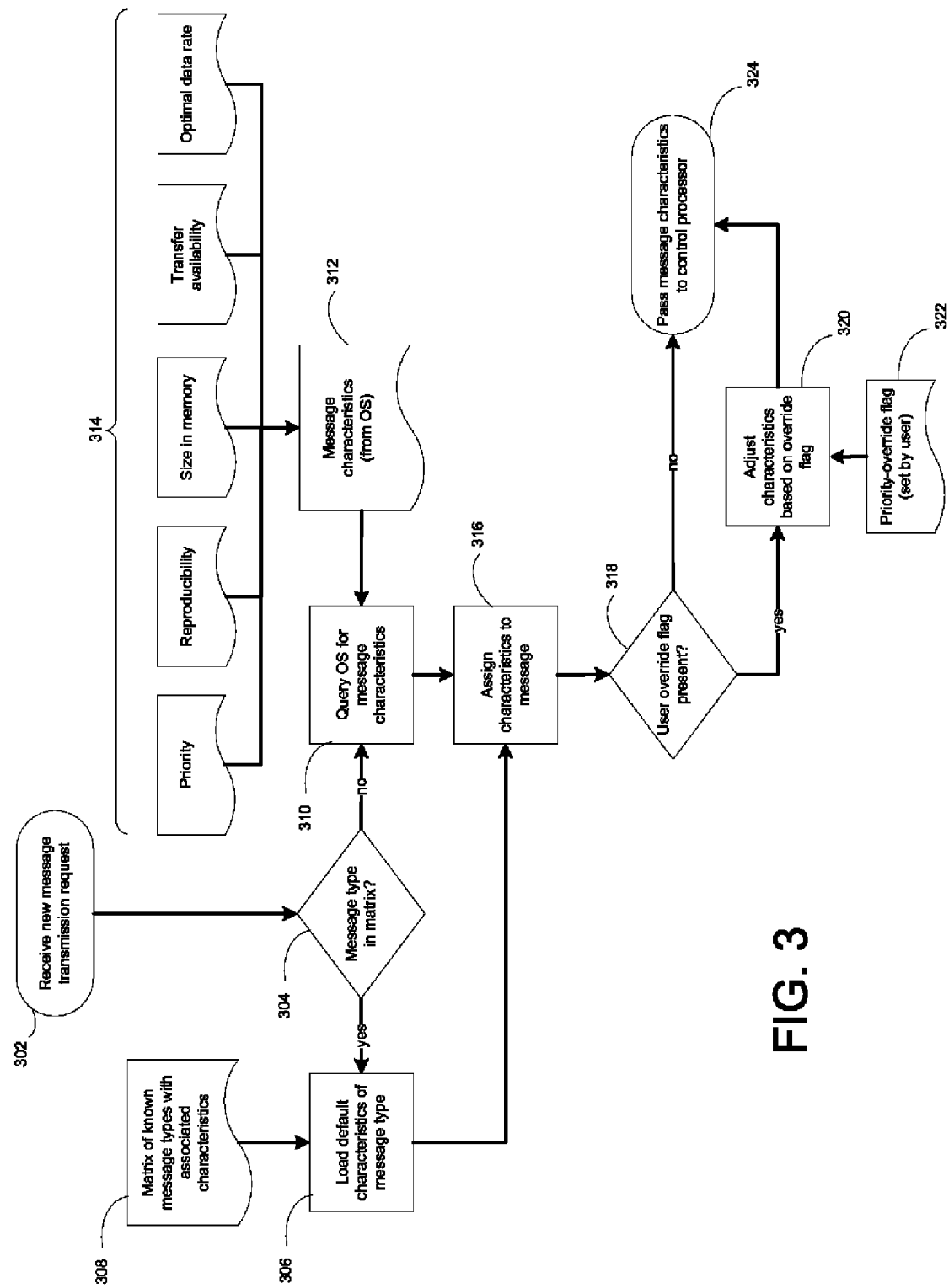
FIG. 3 is a schematic flowchart detailing a method for assigning characteristics to a message to optimize transmission of this and other messages by a communications device.

FIG. 3 is a schematic flowchart detailing a method for assigning characteristics to a message to optimize transmission of this and other messages by a communications device. The assignment (and dynamic reassignment in response to various triggers) of communications resource allocation to the transmission and receipt of messages is related to the characteristics of the messages and other factors. For example, a message may be assigned a certain amount of bandwidth in a given communications protocol based in part upon such characteristics as message priority, reproducibility, size in memory, availability for burst transfer, preferred data rate, or user overrides to priority. These characteristics can be gathered for each message, either provided by the OS in response to a query, or accessed from a pre-existing matrix of known message types and their associated default characteristics. For example, the default characteristics for a short text message may lead to a recommendation to assign this message type to the Bluetooth protocol. These characteristics when combined with further considerations, such as the availability of remote resources on the destination device, the power level of the client device, message priority and the priority of other messages currently being transferred, enable the assignment of the optimal transmission protocol based on the real-world circumstances at the time of transfer. Thus, for known message types, the system can retain a list of default characteristics, which, absent user override, serve to provide a good approximation of the relative communications needs of different message types. However, these characteristics can lead to different actual resource assignments for the transmission of a particular message when other factors, and the characteristics of other active messages, are taken into account.

The process shown in FIG. 3 illustrates the method by which characteristics are assigned to individual messages. The process begins with the introduction of a message to be characterized (step 302). For example, a new file transfer may be initiated by the user, thereby creating a new message to be sent to a remote device (step 302). The message can be queried against a matrix of known message types (step 304). The matrix of known message types 308 can include a list of message types and associated default characteristics. For example, the matrix of known message types 308 may be preloaded on the device, updated via a remote server query, edited by the user, learned dynamically or generated or updated in any other manner. If the message being considered matches a known message type present in the matrix 308, the default characteristics associated with that message type and stored in the matrix 308 can be loaded (step 306). For example, a file transfer may fall into several classes, including voice, video, binary, text, streaming data, or other categories, and the default characteristics associated with each type of message stored in the known message types matrix 308 can be different for each of these and other cases, and these characteristics can be loaded whenever a message of this type was encountered (step 306).

If the message type does not match one of the default message types stored in the known message types matrix 308, the OS can be queried to provide characteristics of the particular message under consideration (step 310). In the example of FIG. 3, the OS can return five characteristics about the message 314, including priority (for instance, whether the application or program generating the message or set to receive the message assigns a high or low priority to the message), reproducibility (for instance, for a voice or live video file, reproducibility is low since the file must be captured and transmitted with first-pass success, yet for a file stored in memory, reproducibility is high, since a failed or interrupted transfer can be restarted or continued after a pause with no backlog), size in memory, transfer availability (for instance, whether the file is stored in memory and ready for burst transfer, or whether the file read will be delayed, either because the file is being streamed from another location or is too large to fit in memory), and optimal data rate (for instance, the preferred data rate at which this type of file is normally transferred, which can be assigned by the application through which the user initiates the request). Collectively these features are, in the example of FIG. 3, shown as message characteristics (from OS) 312 which are returned to the process (step 310).

Thus, in some implementations message characteristics can be obtained by querying a known message type against the matrix of message types and associated characteristics (step 306), or they can be obtained by querying the OS (step 310). In either case, the process then can assign these characteristics to the message as metadata (step 316). Each message can be assigned an associated group of characteristics that are then used by the control processor 108 to prioritize and assign bandwidth to active messages. For example, a voice file to be sent to a remote mobile communications device with several active communications channels can have a certain set of characteristics reflecting the attributes of the file to be sent and the capabilities and limitations imposed upon the transfer by the file type.

Next, it can be ascertained whether the user has set an override flag for any of the characteristics (step 318). Operating via the device user interface 102, the user may have the option to specify criteria that influence or directly override message characteristics. Such input is represented in FIG. 3 as a priority override flag (set by user) 322. The presence of such user input can be ascertained, and if present, the message characteristics can be adjusted (step 320) before being passed back to the control processor (step 324). For example, a user request to send a file via a wireless connection to a nearby printer may carry with it a set of default characteristics that normally induce the control processor 108 to execute the transfer via Bluetooth, but if the user specifies high priority on speed for the transfer, the characteristics may be modified (step 320) to reflect this user priority override 322. These adjusted characteristics may induce the control processor 108 to execute the transfer via WiFi or another protocol, depending upon the availability of transfer resources on the remote printer. In another example, the user may specify a low data rate for a type of file transfer whose default characteristics suggest that a protocol with high data rate be employed for the transfer. In this case, the characteristics could be adjusted to favor a protocol with a lower data rate when the message is considered by the control processor 108. If no user override input is present for the message under consideration, the message characteristics are passed unaltered to the control processor (step 324).

The process illustrated in FIG. 3 can be used to assign characteristics to each message. In the example embodiment shown in FIG. 3, these characteristics can be assigned as metadata accompanying the message object. In other embodiments, the characteristics can be assigned and stored in other ways, for instance in a matrix or array used by the device OS 104 and passed to the control processor 108, or in another manner.

Message characteristics can be assigned in several ways according to the example shown in FIG. 3. First, the message type may match a matrix of known message types, for which default values of the characteristics have been stored previously, in which case the characteristics can be read from the matrix (step 306). Second, the characteristics can be queried directly from the device OS 104 and passed to the characteristics assignment module 122 (step 310). Third, the user may influence the characteristics by specifying priority or other flags directly (step 320). In other embodiments, the characteristics may be acquired through other modes, for instance via transfer from a remote matrix, via learned rules, via an assignment algorithm or by other means. These characteristics then can be used by the control processor 108 to assign the messages to available communications channels in an efficient manner.

In an example embodiment, the assignment of characteristics to individual messages can be handled in the system 100 by the characteristics assignment module 122. In this embodiment, the process illustrated in FIG. 3 can be executed by computer code running in the characteristics assignment module 122, and the process can be invoked dynamically and without direct user input.

Figure 4:
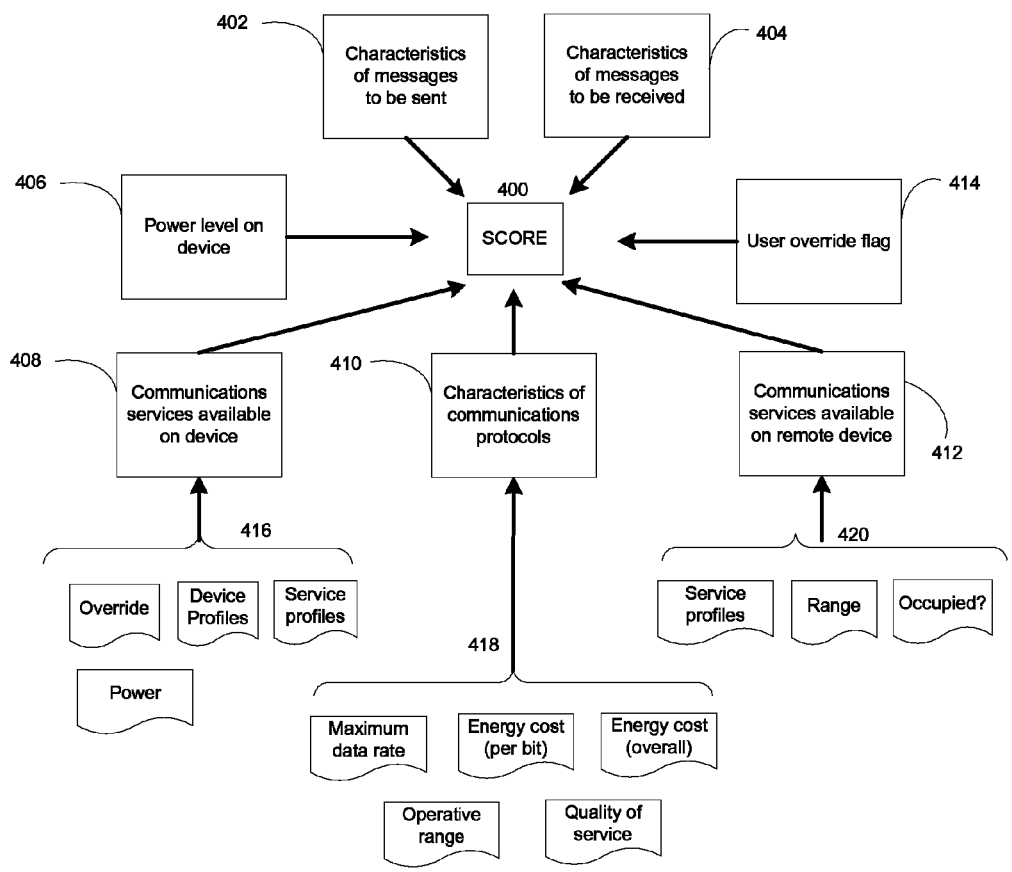
FIG. 4 is a schematic diagram illustrating a method of assigning a score to an individual message.

FIG. 4 is a schematic diagram illustrating the method of assigning a score to an individual message. In the example method shown in FIG. 4, factors that influence the assignment are shown surrounding the score 400. A multitude of factors can influence the assignment of a score 400 to an individual message. In the example of FIG. 4, these factors can include: characteristics of any messages to be sent 402, or characteristics of any messages to be received 404; power level on the device 406; the presence or absence and value, if present, of a user-specified override flag 414; the list of communications services available on the local device 408, which in turn can be influenced by several factors 416; and the list of communications services available on the remote device with which communication will take place for this message 412, which in turn can be influenced by several factors 420; and the characteristics of the available communications protocols 410, which can be reflected as scores by several metrics 418.

The process illustrated in FIG. 4 outlines the general decision process and factors that contribute to the assignment of a score to an individual message. In an example embodiment, this process could be performed by the control processor 108 (step 216) using as input information from the user, the device OS 104 and the system hardware in addition to characteristics of all active messages gathered by the characteristics assignment module 122. The information used to assign a score to an individual message can vary according to device needs, user needs and information available from the device OS 104 and device applications 124. The score assigned can be thought of as a recommended assignment of a communications protocol and a recommendation for bandwidth allocation for a particular message; when weighed against the assigned scores of all other active messages, an actual allocation decision can be made. For example, a single message marked high priority by the user may command a large share of the bandwidth in a particular communications channel when considered alone, whereas the same message with the same assigned score may be allotted less bandwidth in the presence of another message also flagged as high priority and assigned to the same communications channel. In the example embodiment shown, the score of the first message would be the same in either case, but the final resource allocation decision made by the control processor 108 would differ according to the presence of other messages and their scores. In this way, scores assigned to every message actively being transmitted or about to be transmitted enable the control processor 108 to effectively, dynamically and automatically allocate resources in a manner that maximizes quality of service for the user.

Figure 5:
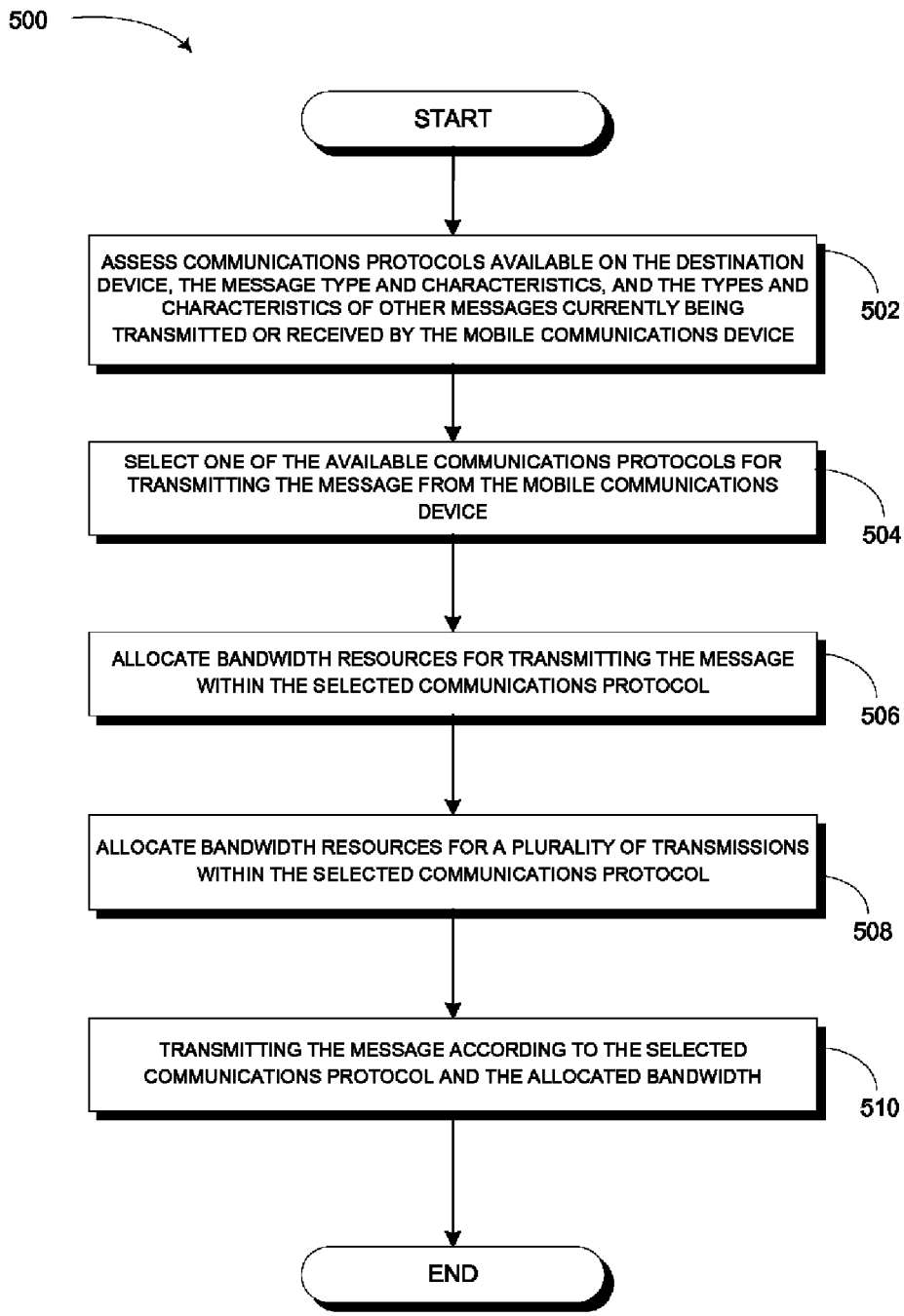
FIG. 5 is a schematic flowchart illustrating a method for optimizing communication between a mobile communications device and other communications devices.

FIG. 5 is a schematic flowchart illustrating a method for optimizing communication between a mobile communications device and other communications devices. The process 500 begins by assessing communications protocols available on the destination device, the message type and characteristics, and the types and characteristics of other messages currently being transmitted or received by the mobile communications device (step 502). For example, the device OS 104 may pass a request to send a message to the control processor 108, which in turn calls upon the characteristics assignment module 122 and synthesizes information to assign a score 400 to each message actively being transmitted, including the new message.

Next, the process proceeds by selecting one of the available communications protocols for transmitting the message from the mobile communications device (step 504). In an example embodiment, this selection may be made by the control processor 108 as shown in step 224. An example of this process would be the assignment of a file transfer request to the Bluetooth protocol by the control processor 104 in accord with the message's characteristics and the characteristics of other active messages.

Bandwidth resources are then allocated for transmitting the message within the selected communications protocol (step 506), and bandwidth resources are allocated also for other transmissions within the selected communications protocol (step 508). In an example system, this allocation decision can be made by the control processor 108 within a loop through available communications protocols (step 228). For instance, the file transfer request assigned to the Bluetooth protocol would be allocated a share of the available bandwidth in this communications protocol, whereas other active messages also assigned to be transmitted or received via this protocol would receive a share of the bandwidth commensurate with their assigned scores.

The message is transmitted according to the selected communications protocol and the allocated bandwidth (step 510). In an example embodiment, the control processor 108 of the wireless communications module 106 passes the allocated bandwidth assignments to the appropriate wireless transceiver 110 and associated antenna 112 to transact the command. For instance, the file transfer request which was assigned a portion of the available bandwidth in the Bluetooth protocol is sent, along with other messages sharing the Bluetooth protocol, to the Bluetooth transceiver and antenna for transmission.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method of transmitting messages from a first mobile communications device to one or more remote communications devices, the method comprising:
    assessing communications protocols available on a remote communications device;
    assessing a first message type and characteristics of a first message to be transmitted, a second message type and characteristics of a second message to be transmitted, and types and characteristics of other messages currently being transmitted or received by the first mobile communications device;
    selecting a first one of the available communications protocols for transmitting the first message from the first mobile communications device to the remote communications device;
    selecting a second one of the available communications protocols for transmitting the second message from the first mobile communications device, the second selected communications protocol being different from the first selected communications protocol;
    allocating bandwidth resources for transmitting the first message within the first selected communications protocol and for transmitting the second message within the second selected communications protocol;
    allocating bandwidth resources for a plurality of transmissions within the first selected communications protocol and for a plurality of transmissions within the second selected communications protocol;
    transmitting the first message with a transceiver on the mobile communications device to the remote communications device according to the selected communications protocol and the allocated bandwidth; and
    transmitting the second message with the transceiver according to the second selected communications protocol and the allocated bandwidth.

2. The method of claim 1 further comprising transmitting a plurality of messages with a plurality of transceivers within the first mobile communications device using the first selected communications protocol.

3. The method of claim 1, further comprising assigning individual messages to communications protocols based upon a plurality of characteristics of each message, so as to optimize quality of service for a user.

4. The method of claim 1, further comprising accessing message characteristics from a matrix of default predetermined message types and associated preset characteristics.

5. The method of claim 1, further comprising adjusting or overriding message characteristics based on user input.

6. The method of claim 1, further comprising updating the bandwidth allocation and the communication protocol selection for the transmission of the first message, during transmission of the first message.

7. The method of claim 6, wherein the process of updating the bandwidth allocation and the communication protocol selection for the transmission of the first message is triggered by one or more of:
    the introduction of a new message to transfer;
    the completion of an existing message transfer;
    input by a user overriding or changing one or more characteristics associated with a message being transferred;
    a change in the communications services available on a remote device with which the first mobile communications device is actively communicating; and/or
    a change to the availability of one or more communications protocols on the first communications device.

8. A method for a first communications device to receive a message from a remote communications device, the method comprising:
- accessing message characteristics from a matrix of default predetermined message types and associated preset characteristics;
- assessing communications protocols available on the remote device, a type and characteristics of the message, and types and characteristics of other messages currently being transmitted or received on the first communications device;
- selecting one of the available communications protocols for receiving the message from the remote communications device;
- allocating bandwidth resources for receiving the message within the selected communications protocol;
- allocating bandwidth resources for a plurality of transmissions within the selected communications protocol;
- receiving the message according to the selected communications protocol and the allocated bandwidth; and
- updating the bandwidth allocation and the communication protocol selection for the receipt of the message, wherein updating the bandwidth allocation and the communication protocol selection for the transmission of the message is triggered by the introduction of a new message to transfer or the completion of an existing message transfer or a change in the communications services available on a remote device with which the first communications device is actively communicating or input by a user overriding or changing one or more characteristics associated with a message being transferred or a change to the availability of one or more communications protocols on the first communications device.

9. The method of claim 8, further comprising assigning individual messages to communications protocols based upon a plurality of characteristics of each individual message, so as to optimize quality of service for a user.

10. The method of claim 8, wherein message characteristics can be adjusted or overridden by considering user input.

11. The method of claim 8, wherein updating the bandwidth allocation and the communication protocol selection for the receipt of the message occurs while receiving the message.

12. A method of transmitting messages from a first mobile communications device to a remote communications device, the method comprising:
- assessing communications protocols available on the remote communications device;
- assessing first message characteristics of a first message to be transmitted;
- selecting, based on the assessment of the available communication protocols and the first message characteristics, a first one of the available communications protocols for transmitting the first message from the first mobile communications device to the remote communications device;
- allocating bandwidth resources for transmitting the first message within the first selected communications protocol;
- allocating bandwidth resources for a plurality of transmissions within one or more of the available communications protocols;
- transmitting the first message to the remote communications device according to the selected communications protocol and the allocated bandwidth; and
- updating the bandwidth allocation or the communication protocol selection for the transmission of the first message based on a triggering event, wherein the triggering event is selected from the group consisting of: the introduction of a new message to transfer; the completion of an existing message transfer; a change in the communications services available on a remote device with which the first mobile communications device is actively communicating; input by a user overriding or changing one or more characteristics associated with a message being transferred; and a change to the availability of one or more communications protocols on the first mobile communications device.

13. The method of claim 12 further comprising transmitting a plurality of messages with a plurality of transceivers within the first mobile communications devices using the first selected communications protocol.

14. The method of claim 12 further comprising transmitting a plurality of messages with a plurality of transceivers within the first mobile communications devices using one or more of the available communications protocols.

15. The method of claim 12, further comprising assigning individual messages to available communications protocols for transmission based upon a plurality of characteristics of each message, so as to optimize quality of service for a user.

16. The method of claim 12, further comprising accessing the first message characteristics of the first message from a matrix of default predetermined message types and associated preset characteristics.

17. The method of claim 12, further comprising adjusting or overriding message characteristics based on user input.

* * * * *